United States Patent
Cianciolo et al.

(10) Patent No.: US 12,278,468 B2
(45) Date of Patent: Apr. 15, 2025

(54) SUPPORT SLEEVE

(71) Applicant: Velcro IP Holdings LLC, Manchester, NH (US)

(72) Inventors: David D. Cianciolo, Sandown, NH (US); Jerry G. Hodsdon, Manchester, NH (US); Matthew P. Cunningham, Manchester, NH (US)

(73) Assignee: Velcro IP Holdings LLC, Manchester, NH (US)

( * ) Notice: Subject to any disclaimer, the term of this patent is extended or adjusted under 35 U.S.C. 154(b) by 0 days.

(21) Appl. No.: 18/113,118

(22) Filed: Feb. 23, 2023

(65) Prior Publication Data

US 2023/0275410 A1     Aug. 31, 2023

Related U.S. Application Data

(60) Provisional application No. 63/313,839, filed on Feb. 25, 2022.

(51) Int. Cl.
*H02G 3/04*     (2006.01)
*D04B 1/16*     (2006.01)
(Continued)

(52) U.S. Cl.
CPC ............. *H02G 3/0456* (2013.01); *D04B 1/16* (2013.01); *D04B 1/22* (2013.01); *D04B 21/16* (2013.01);
(Continued)

(58) Field of Classification Search
CPC ...... H02G 3/0456; H02G 3/0608; H02G 3/32; F16B 2/08; F16B 2200/81; A47B 2097/003; A47B 97/00; F16M 11/00; F16M 13/00
See application file for complete search history.

(56) References Cited

U.S. PATENT DOCUMENTS 2,854,352 A * 9/1958 Gronemeyer .......... H01B 3/084
                                                    442/151
4,138,193 A * 2/1979 Olszewski ........... G02B 6/4403
                                                    174/117 F
(Continued)

FOREIGN PATENT DOCUMENTS

CA     2412398 A1 * 5/2004 .......... H02G 3/0487
CA     2801907       7/2014
(Continued)

OTHER PUBLICATIONS

International Search Report and Written Opinion in International Appln. No. PCT/US2023/013674, mailed May 31, 2023, 12 pages.

*Primary Examiner* — Monica E Millner
(74) *Attorney, Agent, or Firm* — Fish & Richardson P.C.

(57) ABSTRACT

A flexible support sleeve includes a knit fabric sheet with loops of fibers on a fastening face, a strip of resin overlaying a portion of the fastening face along one edge, with a strip of adhesive disposed along the same edge on an opposite side. The strip of resin includes male touch fastener elements configured to engage the loops of the knit fabric sheet. The strip of resin has a selvedge coterminous with the edge of the flexible support sleeve and void of male touch fastener elements, such that the selvedge of the base is not engageable with the loops of the knit fabric sheet. The strip of adhesive is wider than the strip of resin, such that the adhesive strip underlays all of the discrete male touch fastener elements of the strip of resin.

20 Claims, 9 Drawing Sheets

(51) Int. Cl.
- *D04B 1/22* (2006.01)
- *D04B 21/16* (2006.01)
- *D04B 21/20* (2006.01)
- *D06N 3/00* (2006.01)
- *H02G 3/06* (2006.01)

(52) U.S. Cl.
CPC .......... *D04B 21/20* (2013.01); *D06N 3/0009* (2013.01); *H02G 3/0608* (2013.01); *D06N 2201/0263* (2013.01); *D10B 2331/02* (2013.01); *D10B 2505/00* (2013.01)

(56) References Cited

U.S. PATENT DOCUMENTS

| | | | | |
|---|---|---|---|---|
| 4,934,646 | A * | 6/1990 | Doyle | B65D 63/18 248/205.2 |
| 5,048,158 | A * | 9/1991 | Koerner | A44B 18/00 D8/382 |
| 5,142,743 | A * | 9/1992 | Hahn | B65D 63/10 24/442 |
| 5,211,784 | A * | 5/1993 | Haibach | B32B 27/12 156/291 |
| 5,242,063 | A * | 9/1993 | Ericksen | A47K 3/281 248/205.2 |
| 5,260,015 | A | 11/1993 | Kennedy et al. | |
| 5,624,403 | A * | 4/1997 | Jaquith | A61M 25/02 604/179 |
| 5,971,508 | A * | 10/1999 | Deimen | A47B 97/00 108/50.02 |
| 6,202,260 | B1 * | 3/2001 | Clune | B29C 43/46 24/30.5 R |
| 6,205,623 | B1 * | 3/2001 | Shepard | A44B 18/0049 24/30.5 R |
| 6,349,904 | B1 * | 2/2002 | Polad | F16L 3/137 248/74.3 |
| 6,655,643 | B1 * | 12/2003 | Hoyl | H05K 7/1449 248/68.1 |
| 6,701,580 | B1 * | 3/2004 | Bandyopadhyay | B65D 63/10 24/304 |
| 7,588,216 | B1 * | 9/2009 | Hoyl | H02G 3/30 248/205.2 |
| 10,306,952 | B2 * | 6/2019 | Cheng | B65D 33/00 |
| 10,498,049 | B2 * | 12/2019 | Hoehne | H01R 13/5213 |
| 11,774,214 | B2 * | 10/2023 | Bernaz | A45F 3/14 29/525.01 |
| 2001/0022012 | A1 | 9/2001 | Shepard et al. | |
| 2002/0022108 | A1 | 2/2002 | Krantz et al. | |
| 2003/0034583 | A1 | 2/2003 | Provost | |
| 2003/0059562 | A1 * | 3/2003 | Lien | F16L 57/00 428/36.9 |
| 2003/0074768 | A1 | 4/2003 | Shepard et al. | |
| 2004/0058121 | A1 | 3/2004 | Schriefer et al. | |
| 2004/0099426 | A1 * | 5/2004 | Bryl | H02G 15/18 174/350 |
| 2004/0255435 | A1 * | 12/2004 | Barger | F16L 3/233 24/306 |
| 2005/0060849 | A1 | 3/2005 | Vanbenschoten et al. | |
| 2005/0098345 | A1 * | 5/2005 | Niehaus | H02G 3/0487 174/135 |
| 2005/0101930 | A1 | 5/2005 | Tachauer et al. | |
| 2006/0032032 | A1 * | 2/2006 | Cheng | H02G 3/32 24/306 |
| 2006/0226571 | A1 | 10/2006 | Clune | |
| 2008/0135119 | A1 * | 6/2008 | Tonooka | D03D 1/0043 138/167 |
| 2011/0123759 | A1 * | 5/2011 | Rodrigues | D03D 1/0043 428/100 |
| 2013/0067701 | A1 | 3/2013 | Grady et al. | |
| 2014/0027584 | A1 * | 1/2014 | Pauchet | F16L 3/123 248/68.1 |
| 2015/0104614 | A1 | 4/2015 | Gallant | |
| 2016/0264328 | A1 * | 9/2016 | Barger | H02G 3/32 |
| 2017/0165937 | A1 | 6/2017 | Gallant | |
| 2021/0339664 | A1 | 11/2021 | Voigt et al. | |
| 2022/0049129 | A1 * | 2/2022 | Schmidlin | B32B 5/266 |
| 2022/0297580 | A1 | 9/2022 | Voigt et al. | |

FOREIGN PATENT DOCUMENTS

| | | |
|---|---|---|
| CN | 1325280 | 12/2001 |
| CN | 115461548 | 12/2022 |
| DE | 29602362 | 1/1997 |
| EP | 1143819 | 10/2001 |
| EP | 1265507 | 12/2002 |
| EP | 1272139 | 1/2003 |
| EP | 1320306 | 6/2003 |
| EP | 1669000 | 6/2006 |
| EP | 1691638 | 8/2006 |
| EP | 1848295 | 10/2007 |
| EP | 2140775 | 1/2010 |
| EP | 4143446 | 3/2023 |
| JP | 2002529123 | 9/2002 |
| JP | 2011037521 | 2/2011 |
| WO | WO 2000/027235 | 5/2000 |
| WO | WO 2001/067911 | 9/2001 |
| WO | WO 2001/068019 | 9/2001 |
| WO | WO 2002/025789 | 3/2002 |
| WO | 1438844 | 8/2003 |
| WO | WO 2005/046380 | 5/2005 |
| WO | WO 2006/108049 | 10/2006 |
| WO | WO 2021/222364 | 11/2021 |

\* cited by examiner

SUPPORT SLEEVE

TECHNICAL FIELD

This invention relates to support sleeves, and more particularly to sleeves for holding a portion of a length of wire or cable to a support surface.

BACKGROUND

Electrical appliances, computer components and other devices often have flexible cords or cables for power or data that must be routed from the device to something else. For example, lamps may have a power cord that must be routed to an outlet. Within a computer enclosure, a data cable may be routed to connect various electronic components. Flexible cords or cables, by their nature, may not remain precisely in the most advantageous position along their length. In some instances, a cord or cable may move to where it is more likely to be damaged or obtrusive, or simply not desired. There have been many items developed to secure cables and cords, with varying degrees of utility and success.

SUMMARY

In one aspect of the invention, a flexible support sleeve includes a knit fabric sheet having finite width and length and extending to opposite edges. The knit fabric sheet has a fastening face with loops of fibers extending away from a knit fabric base and forms part of a first side of the flexible support sleeve. A strip of resin of limited width overlays a first portion of the fastening face of the fabric sheet along one edge of the fabric sheet. The strip of resin includes resin impregnating the fabric sheet to form a base, and an array of discrete male touch fastener elements carried on the base. Each male touch fastener element has a stem extending from and contiguous with the base and a head disposed at a distal end of the stem and overhanging the base to form a crook for engaging the loops of the knit fabric sheet to form a releasable fastening. A strip of adhesive is disposed on a second side of the flexible support sleeve, at least partially underlying the strip of resin. The base formed by the impregnating resin has a selvedge, coterminous with an edge of the flexible support sleeve and void of male touch fastener elements, such that the selvedge of the base is not engageable with the loops of the knit fabric sheet. The strip of adhesive underlays all of the discrete male touch fastener elements of the strip of resin.

The selvedge preferably has a width, extending from the edge of the flexible support sleeve, that is greater than 10 percent and less than 60 percent of the limited width of the strip of resin.

In some embodiments, the array of discrete male touch fastener elements includes rows of fastener elements extending parallel to the one edge of the fabric sheet. The selvedge preferably has a width greater than a width of a nearest one of the rows of fastener elements.

The strip of adhesive is preferably at least as wide, in some cases twice as wide, as the strip of resin.

In some embodiments the flexible support sleeve has a width, as measured perpendicular to the edge, that is between three and eight times the limited width of the strip of resin. In many embodiments, the flexible support sleeve is at least as long as it is wide.

In some cases, the loops of fibers are disposed on the first side of the fabric sheet.

Some examples also include a removable release liner covering the strip of adhesive.

The adhesive preferably covers no more than half of the second side of the flexible support sleeve.

The knit fabric sheet preferably has a basis weight of between about 280 and 330 grams per square meter, and forms at least portions of each of the first and second sides of the flexible support sleeve.

In some examples, the flexible support sleeve consists essentially of the knit fabric sheet, the strip of resin, and the strip of adhesive, plus any removable release liner covering the strip of adhesive.

In some cases, the knit fabric extends between the base and the adhesive and has an edge coterminous with the edge of the flexible support sleeve.

In some embodiments, the fastening face of the knit fabric covers all of the first side of the flexible support sleeve other than the strip of resin.

The loops of fibers of the fastening face of the fabric sheet preferably extend to a height higher than an upper surface of the base of the strip of resin. Preferably, the touch fastener elements extend to a height higher than the loops of fibers of the fastening face of the fabric sheet.

In some embodiments, a series of flexible support sleeves as described above are joined along adjacent longitudinal edges by frangible links.

The details of one or more embodiments of the invention are set forth in the accompa-nying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
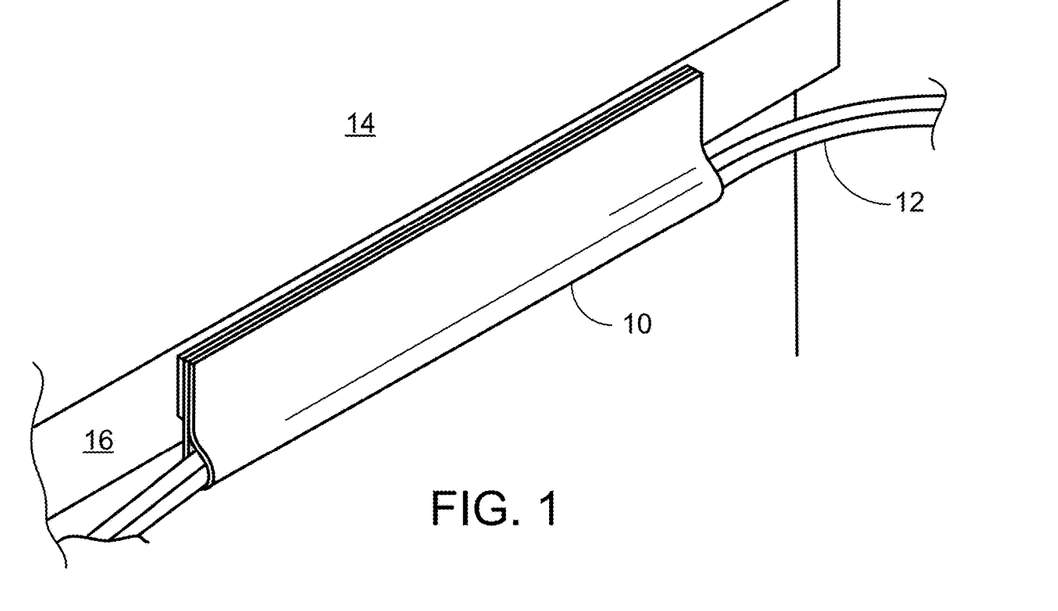
FIG. 1 is a perspective view of a first flexible support sleeve holding a cable to a support surface.

Referring first to FIG. 1, a flexible support sleeve 10 in the form of a folded flexible sheet is shown securing a cable 12 to an edge of a table 14. The table edge has a vertical surface 16 to which the sleeve is permanently, or removably, adhered. As shown, the sleeve is wrapped about the cable 12 to hold the cable in place along the edge of the table.

Figure 2:
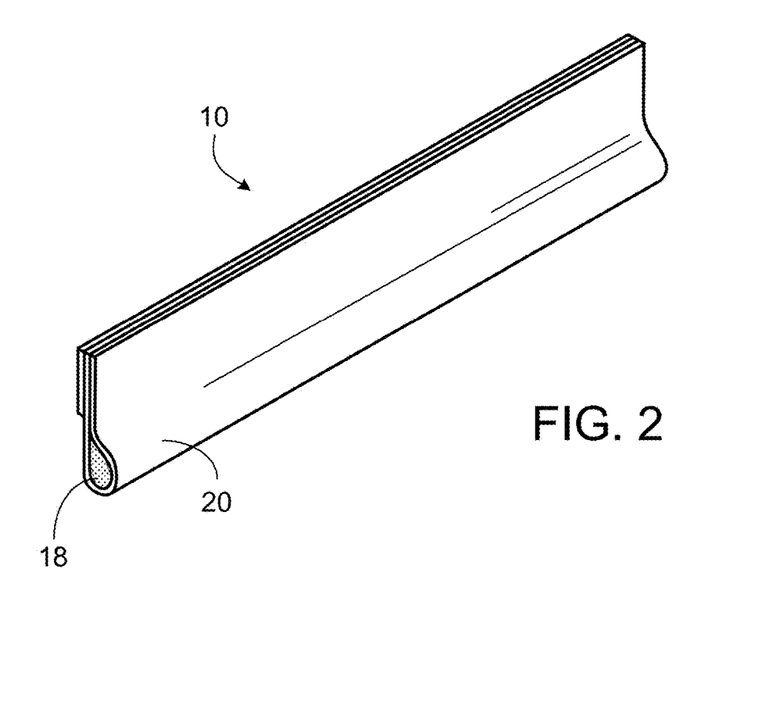
FIG. 2 shows the flexible support sleeve standing alone.

Referring to FIG. 2, sleeve 10 has an inside surface 18 and an outside surface 20 when it is formed into a loop for use. The inside surface 18 of the loop is formed by a soft knit material, without sharp edges or burrs that can cause damage to the cable. The soft inner surface does not chafe the cable surface if the cable is moved longitudinally while secured. The outside surface 20 generally has an exposed portion that can bear logos or other graphics to be visible when the sleeve is in use. As shown, the sleeve is formed into a loop by bringing the two longitudinal edges of the sleeve into alignment and touching the adjacent surfaces near the edges together to engage their corresponding fastening features.

Figure 3:
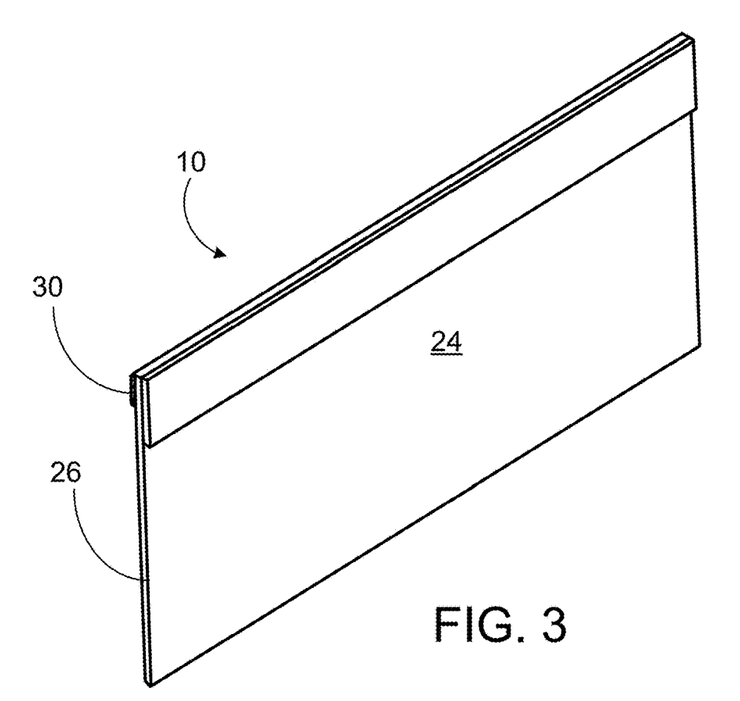
FIG. 3 is a perspective view of a back side of the flexible support sleeve in an open condition, such as before use.
Figure 4:
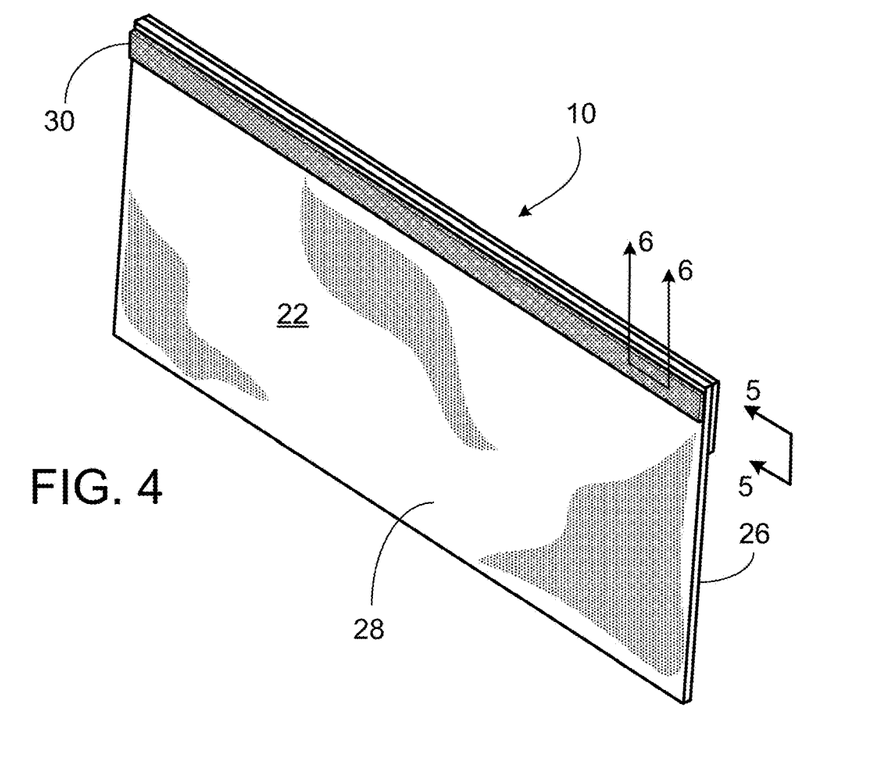
FIG. 4 is a perspective view of a front side of the flexible support sleeve in the open condition.

Referring next to FIGS. 3 and 4, when opened the sleeve 10 is in the form of a flexible sheet having a front side 22 and a back side 24. The body of the sleeve is formed by a knit fabric sheet 26 having finite width and length and extending to opposite edges, the knit fabric sheet having a fastening face 28 with loops of fibers extending away from a knit fabric base. The fastening face of the knit fabric sheet forms part of the front side of the flexible support sleeve. A strip 30 of resin of limited width overlays a portion of the fastening face 28 of the fabric sheet along one edge. As shown in FIG. 4, the fastening face 28 of the knit fabric covers all of the front side 22 of the flexible support sleeve 10 other than the strip 30 of resin.

Figure 5:
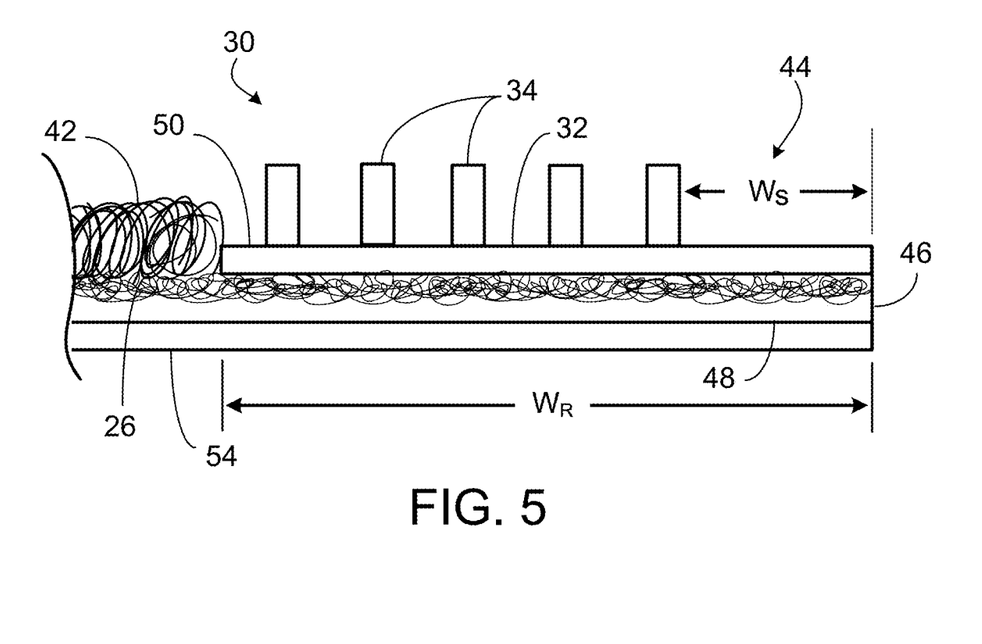
FIG. 5 is an enlarged side view, taken along line 5-5 in FIG. 4.
Figure 6:
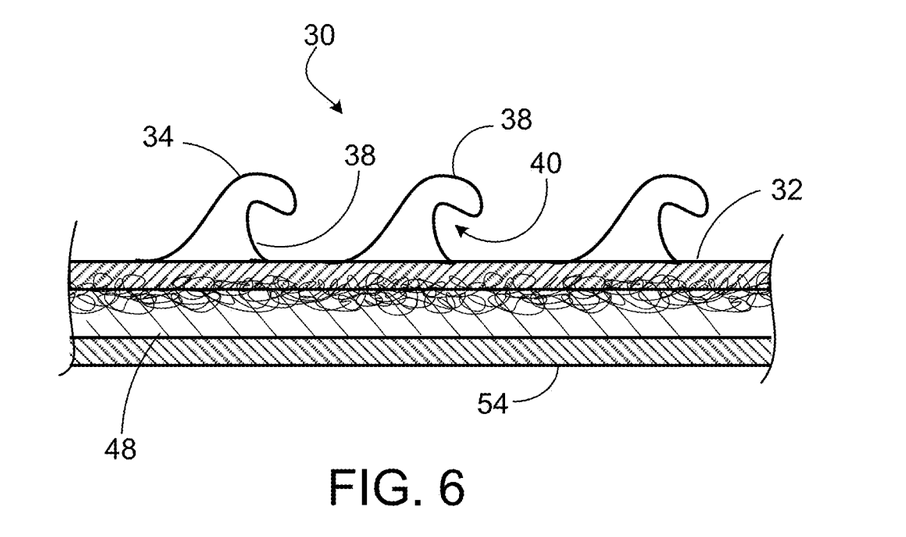
FIG. 6 is an enlarged cross-sectional view, taken along line 6-6 in FIG. 4.

Referring also to FIGS. 5 and 6, the strip 30 of resin includes resin impregnating the fabric sheet 26 to form a base 32, and an array of discrete male touch fastener elements 34 carried on the base. Each male touch fastener element has a stem 36 extending from and contiguous with the base and a head 38 disposed at a distal end of the stem and overhanging the base to form a crook 40. The crooks male touch fastener elements 34 are configured to engage the loops 42 of the knit fabric sheet to form a releasable fastening. The base 30 formed by the impregnating resin has a selvedge 44, coterminous with an edge 46 of the flexible support sleeve and void of male touch fastener elements, such that the selvedge 44 of the base is not engageable with the loops 42 of the knit fabric sheet.

A strip of adhesive 48 is disposed on the back side of the flexible support sleeve, at least partially underlying the strip 30 of resin. In this example the strip of adhesive 48 is wider than the strip 30 of resin (preferably at least twice as wide as the strip of resin, but covering no more than half of the second side of the flexible support sleeve), such that the adhesive strip underlays all of the discrete male touch fastener elements 34 of the strip of resin. The adhesive strip may be a combination of multiple layers, such as a permanent adhesive layer against the fabric, a film, and then a pressure sensitive layer for attaching the product to a support surface. As shown in FIG. 5, the knit fabric 26 itself extends between the base 30 (which impregnates the knit foundation of the fabric) and the adhesive 48, such that its edge is coterminous with the edge 46 of the flexible support sleeve.

As shown in FIG. 5, the selvedge 44 of the base has a width $W_S$, extending from the edge 46 of the flexible support sleeve, that is preferably greater than 10 percent and less than percent of the limited width $W_R$ of the strip 30 of resin. In this example the selvedge width $W_S$ is ⅛ inch or about 3.2 mm. The male touch fastener elements of the array are arranged in rows extending parallel to the edge of the fabric sheet, and the selvedge width $W_S$ is greater than an average width of the rows, and in particular greater than the width of a nearest one of the rows of fastener elements. The loops 42 of fibers of the fastening face of the fabric sheet extend to a height higher than an upper surface 50 of the base 32 of the strip of resin, whereas the touch fastener elements 34 extend to a height higher than the loops 42 of fibers of the fastening face of the fabric sheet. In this example, the touch fastener elements 34 extend to a height about 0.8 mm above the upper surface 50 of the base 30 of the strip of resin, and the loops 42 of fibers extend to a height about 0.8 mm above the upper surface 50 of the base 30 of the strip of resin, such that they extend to approximately the same height as the hooks. In some other cases the hooks extend higher than the loops. The male fastener elements 34 and the connecting base 32 of resin can be formed, for example, of linear low density polyethylene and molded directly on a side of the knit fabric, such as in the process described by Kennedy et al., in U.S. Pat. No. 5,260,015, the contents of which are incorporated herein by reference. The male touch fastener elements may be hook-shaped, mushroom-shaped, palm-tree-shaped, or of any other fastener element shape known to be useful for engaging loops. In this example, the fastener elements are molded as J-hooks, of the shape available from Velcro USA Inc. as Hook 22.

Figure 7:
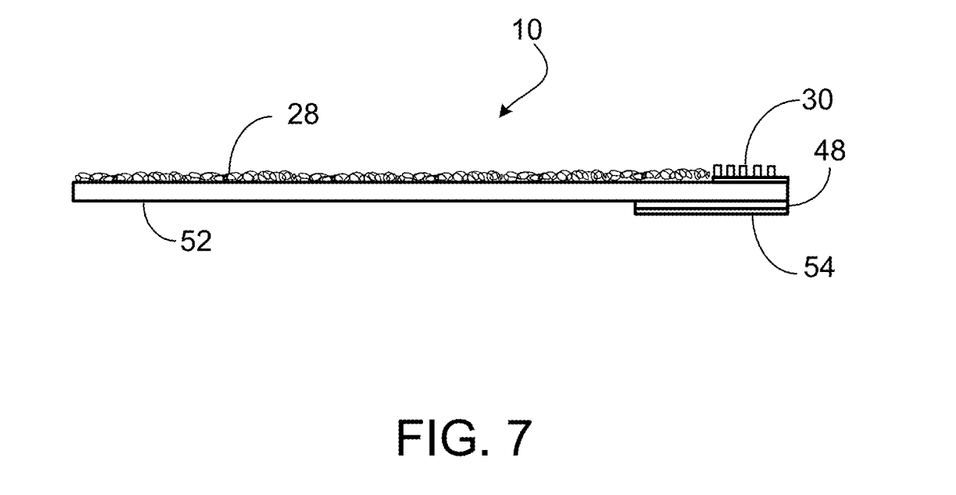
FIG. 7 is a side view of the flexible support sleeve.
Figure 8:
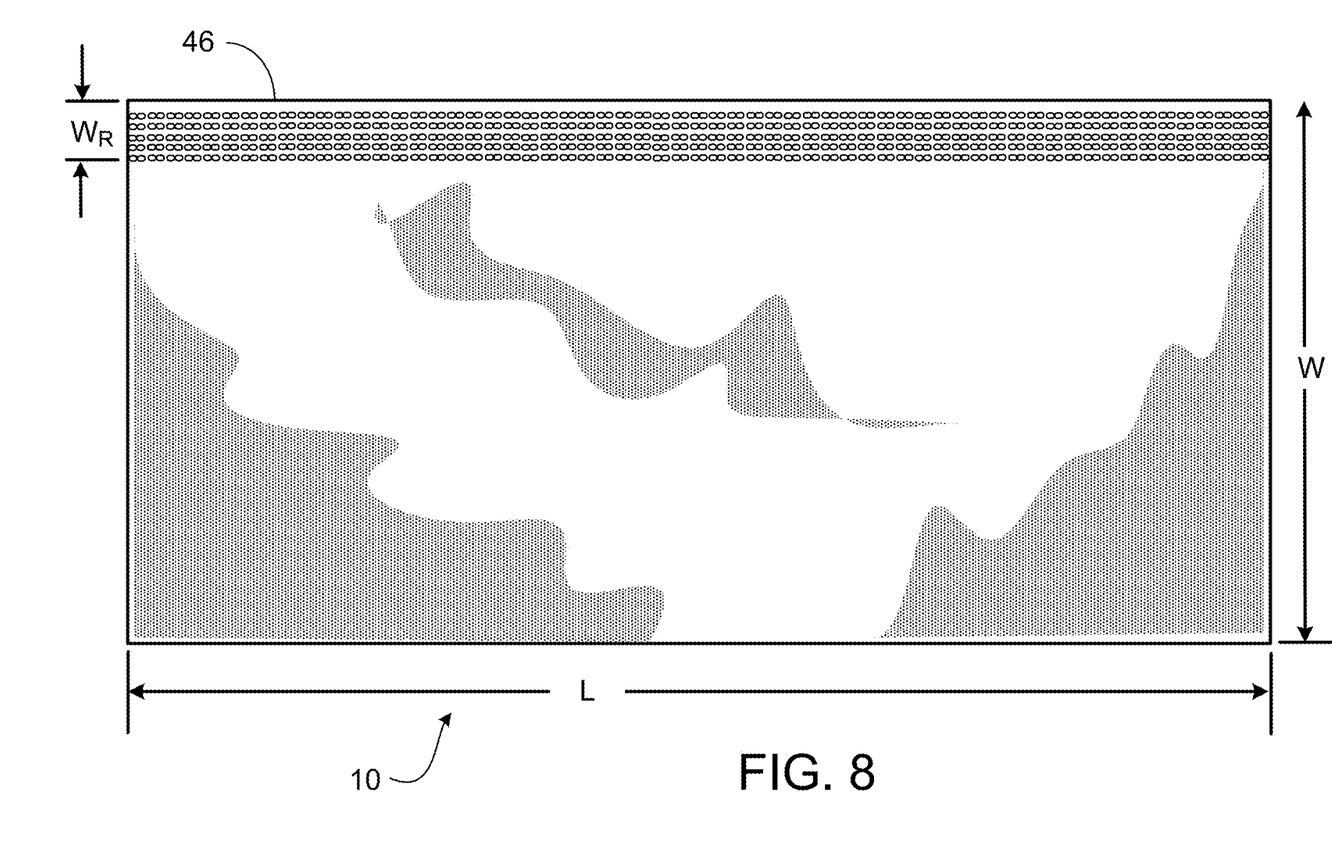
FIG. 8 is a front view of the flexible support sleeve.

Referring next to FIGS. 7 and 8, the flexible support sleeve has a width W, as measured perpendicular to the edge 46 adjacent the strip 30 of resin, that is at least twice, or at least three times, the limited width $W_R$ of the strip of resin. In this example, the width W of the overall sleeve is about 120 mm, while the width $W_R$ of the strip of resin is about 12.5 mm. The flexible support sleeve 10 is at least as long, with overall length L, as it is wide. A few examples of useful sleeve sizes are 200 mm (L) by 120 mm (W), 300 mm (L) by 150 mm (W), and 900 mm (L) by 150 mm (W).

The technical face 52 of the knit fabric 26 forms the back side of the flexible support sleeve and the outer surface of the sleeve as formed into a loop about a cable. The technical back of the fabric features the loops and forms fastening side 28 of the flexible support sleeve and the inner surface of the loop in use. In the figures, the foundation of the knit fabric is illustrated for simplicity as a solid layer, but is in fact permeable. The knit fabric foundation may include a binder to stabilize the fabric and provide dimensional stability to the sheet. The fabric may also be provided with a flexible backing (not shown) to form the outside surface of the looped sleeve in use. However, in this example the flexible support sleeve consists essentially of the knit fabric sheet 26, the strip 30 of resin, and the strip of adhesive 48. The knit fabric preferably forms at least portions of each of the front and back sides of the flexible support sleeve.

A suitable material for knit fabric sheet 26 is nylon knit loop 3610, available from Velcro USA Inc. in Manchester, N.H. The overall thickness of this material is about 0.045 inch or about 1.1 mm with minimal compression. The knit fabric sheet 26 has a basis weight of between about 280 and 330 grams per square meter. The knit fabric is preferably of uniform construction across the width and length of the flexible support sleeve. In some cases several sleeve preforms can be formed from a single supply of knit fabric with strips of resin laminated along its length, by trimming the supply of laminated fabric along its length at appropriate points. Adhesive can be applied continuously along the technical face of the fabric, either before or after the fabric is trimmed to widths. Each continuous length can then be cut transversely into individual flexible support sleeves.

Figure 9:
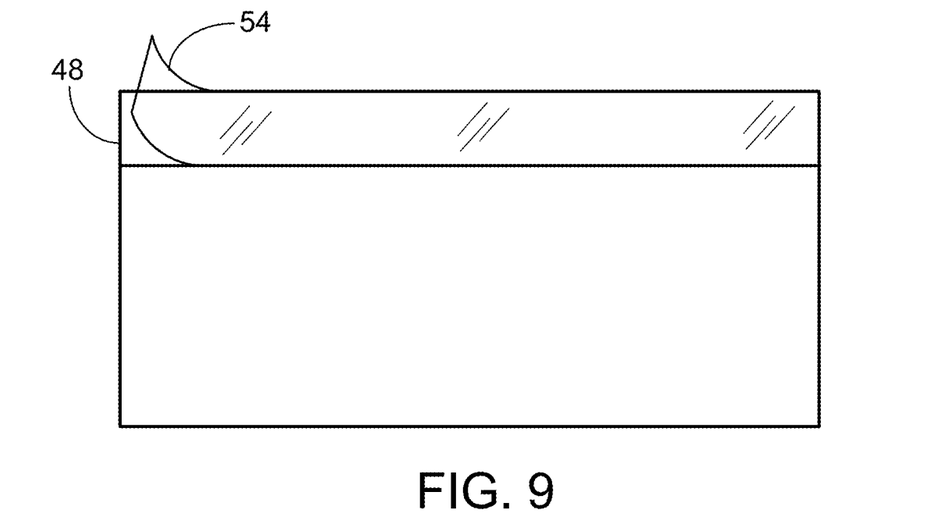
FIG. 9 is a back view of the flexible support sleeve, showing the release liner being removed.

Referring last to FIG. 9, a removable release liner 54 covers the strip of adhesive 48 during shipment and is peeled away to expose the adhesive 48 for securing the flexible support sleeve to a support such as the table in FIG. 1.

To install the flexible support sleeve, the release liner 54 is first peeled away and discarded. The exposed adhesive 48 is then pressed against the support surface to form a bond, with the front side of the flexible support sleeve, with the strip 30 of resin, facing away from the support surface. The tail or loose portion of the flexible support sleeve is then wrapped about the cable to be secured and the distal portion of the front side of the flexible support sleeve is pressed against the strip 30 of resin so that the loops of the technical back of the knit fabric are releasably engaged with the touch fastener elements of the strip of resin. The peel strength of the engagement between hooks and loops need only be sufficiently strong to withstand any loads tending to open the loop formed by the sleeve. The selvedge running along the edge of the strip of resin helps to prevent any delamination or separation of the strip of resin from the edge of the knit fabric, as the peel loads are applied no closer to the edge than the first row of fastener elements and are resisted by the encapsulation of resin underlying the entire width of the selvedge. The selvedge also provides a finger tab for grasping the edge of the product, and helps to prevent peeling the product away from the support surface when opening the hook and loop closure, such as to add or remove cords.

Figure 10:
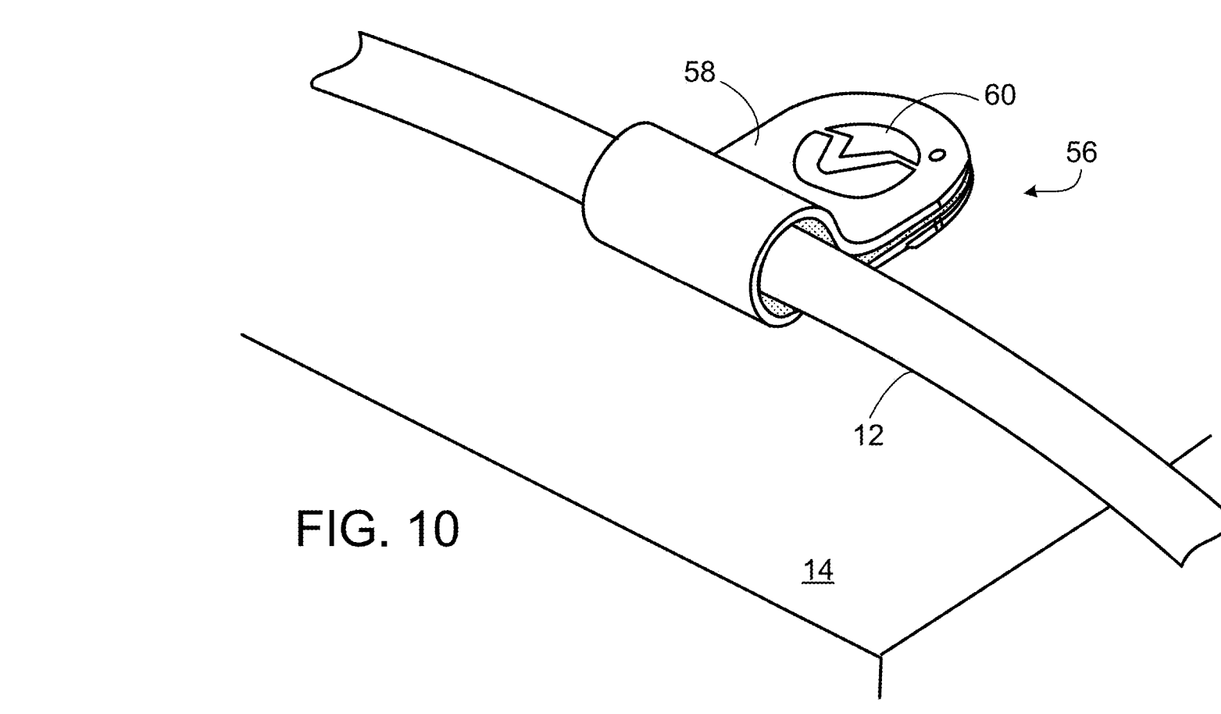
FIG. 10 is a perspective view of a second flexible support sleeve holding a cable to a support surface.

Referring next to FIG. 10, another example of a support sleeve 56 is in the form of a tab with curved ends, one of which is adhered to a support surface 14 and is overlaid by the other end with the tab wrapped about a cable 12. As with the embodiment described above, the body of sleeve 56 is formed of a knit loop material with a technical face that forms the outside of the tab when folded. In this example, the outer surface 58 carries a logo 60 or other graphic. The technical back may be covered with an impermeable resin layer onto which the logo is molded or printed.

Figure 11:
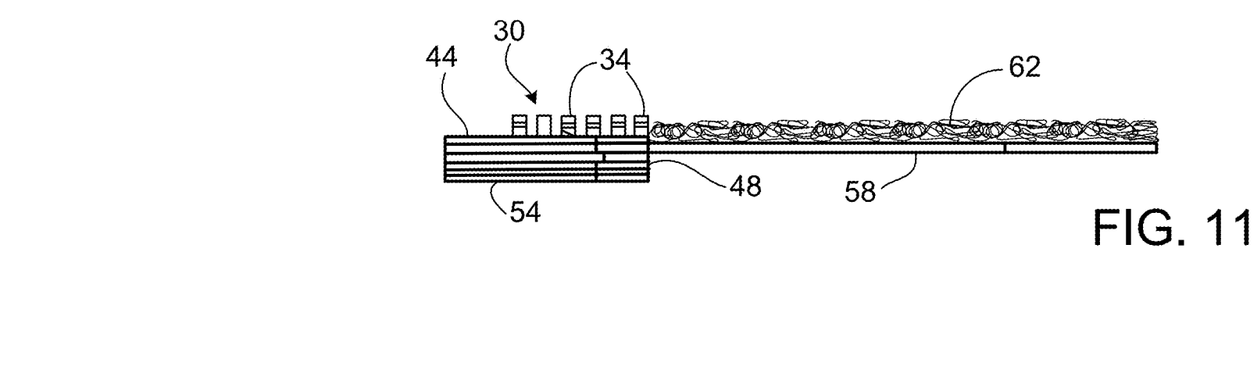
FIG. 11 is a side view of the flexible support sleeve of FIG. 10.
Figure 12:
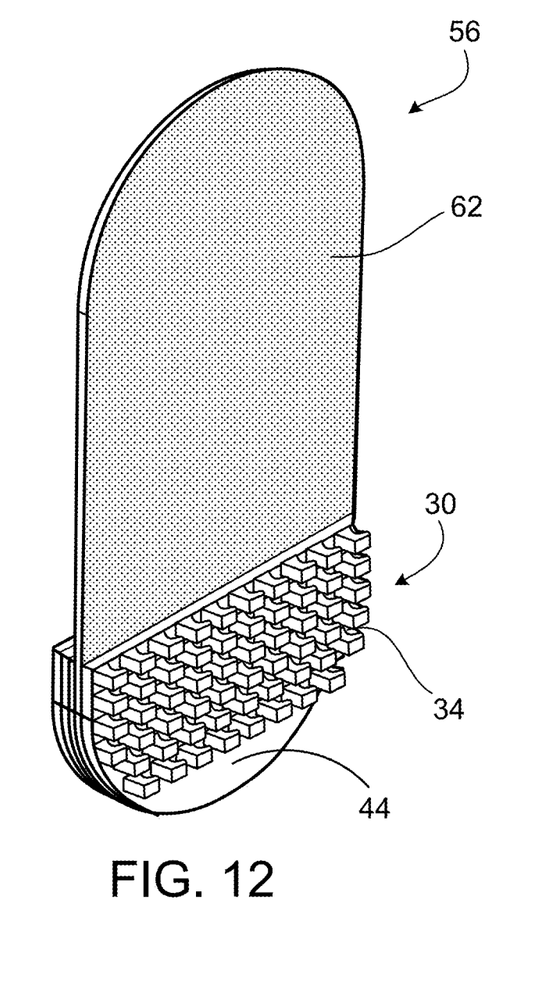
FIG. 12 is a front perspective view of the flexible support sleeve of FIG. 10.
Figure 13:
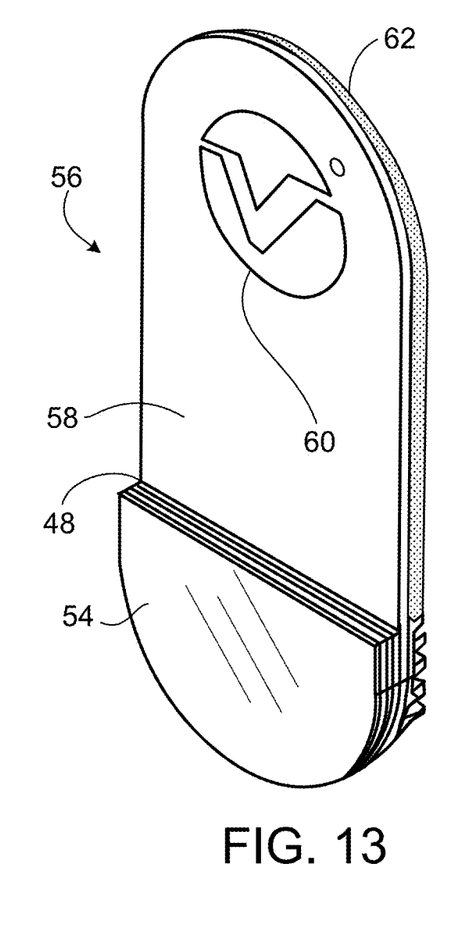
FIG. 13 is a rear perspective view of the flexible support sleeve of FIG. 10.

Referring also to FIGS. 11-13, when open and before being mounted to the support surface, sleeve 56 has a stadium shape with two parallel longer sides and two semi-circular ends. The technical back 62 of the knit material forms most of one side of the sleeve, along with a layer 30 of resin forming an array of touch fastener elements 34. As in the earlier embodiment, a selvedge 44 at one end of the sleeve is formed by the layer of resin but without fastener elements. Preferred ratios of the extent of the layer of resin and of the selvedge along the length of the sleeve are as in the previous embodiment. The technical back 62 of the knit material carries loops releasably engageable with the male fastener elements when the sleeve is looped over a cable. As in the prior embodiment, a release liner 54 covers a layer of pressure sensitive adhesive until ready for mounting. One difference between sleeve 56 and the sleeve of FIGS. 1-9 is that the adhesive layer 48 has essentially the same extent along the length of the sleeve as the layer 30 of resin carrying the fastener elements.

Figure 14:
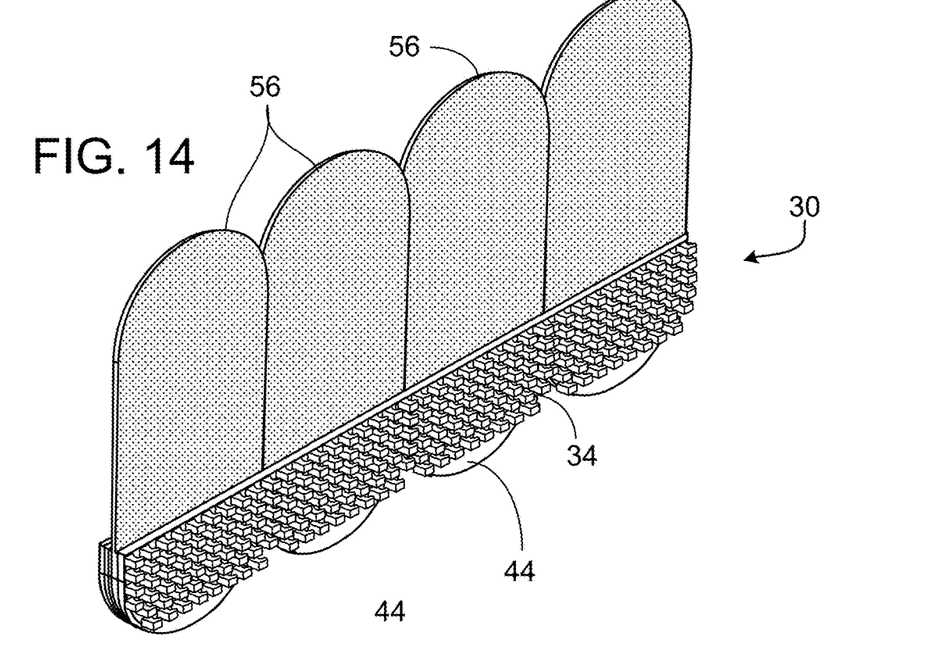
FIG. 14 is a front perspective view of a series of flexible support sleeves of FIG. 10.
Figure 15:
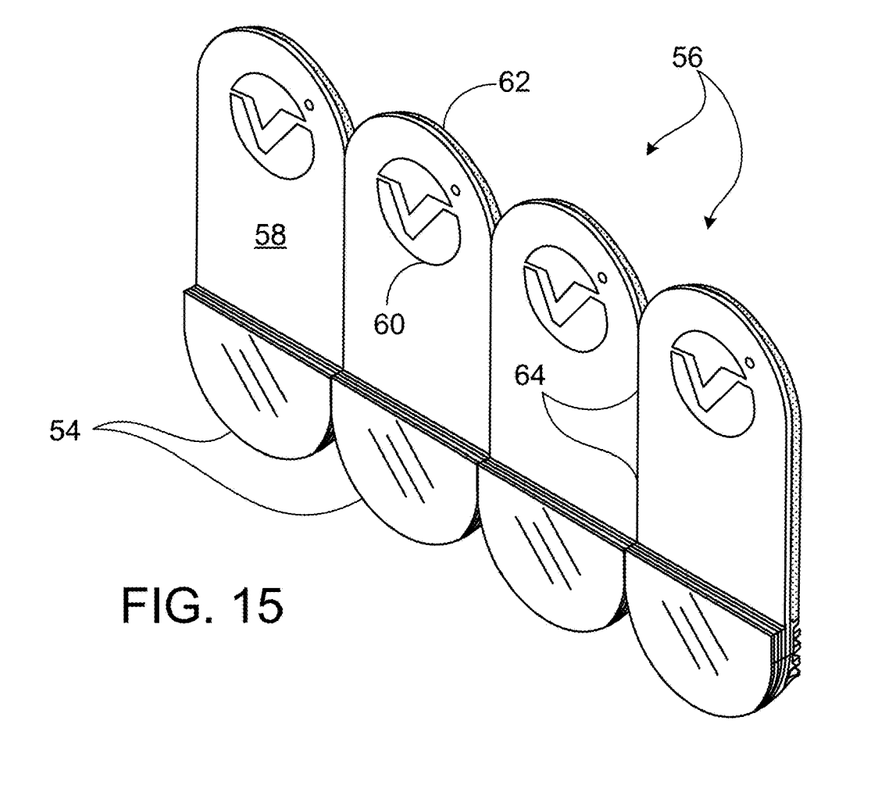
FIG. 15 is a rear perspective view of a series of flexible support sleeves of FIG. 10.

Referring next to FIGS. 14-15, sleeves 56 can be formed as a series of interconnected sleeves die cut from a continuous sheet of material formed by a knit fabric to which the resin layer, adhesive and release liner have been added. The resin layer material may be molded onto one side of the knit material as a continuous strip. The adhesive may be sprayed or rolled onto the other side of the knit material as a continuous strip and then covered with a continuous release liner. As noted above, the adhesive layer may be a combination of overlapping layers. Subsequently, the continuous product is run through a die cutting station that severs the material along the peripheries of each sleeve other than at a few points where the longitudinal sides of adjacent sleeves are joined by frangible links 64. The sleeves may be packaged as strips of, for example, five discrete sleeves as shown. For use, individual sleeves can be separated manually from an adjacent sleeves.

Figure 16:
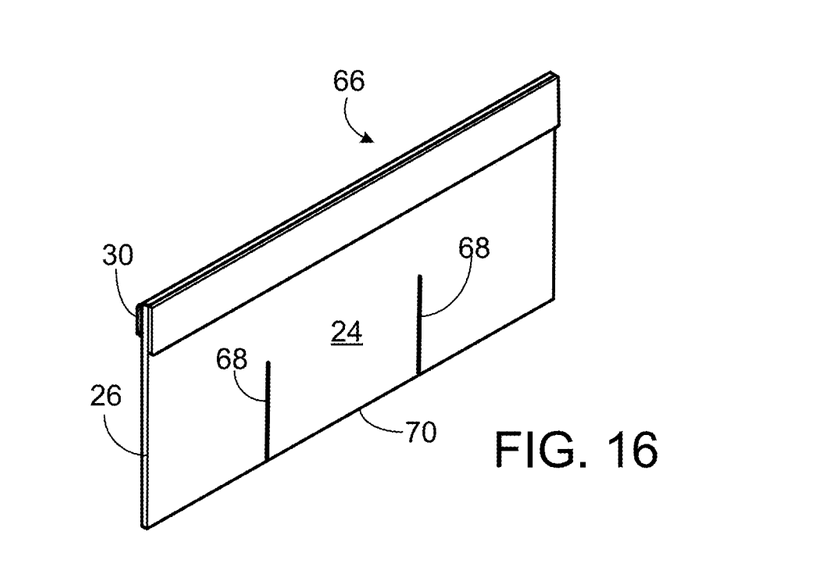
FIGS. 16 and 17 show a third flexible support sleeve defining slits.
Figure 17:
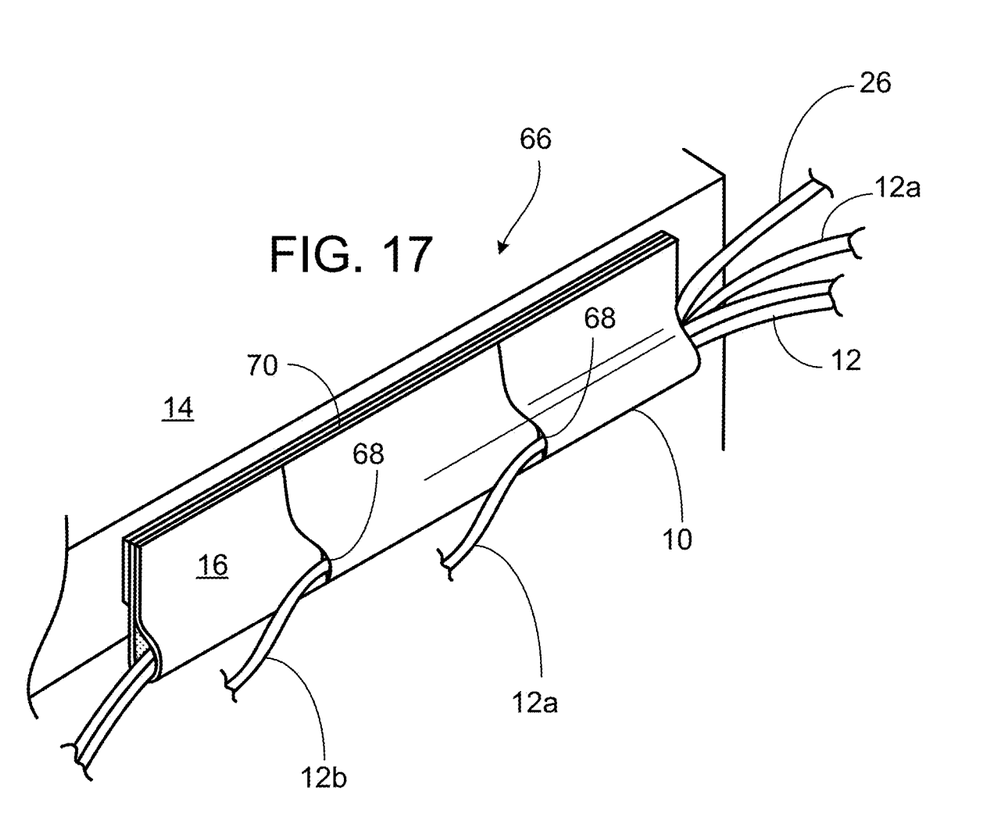

In some cases the sleeve may enable different routings for different cables, or for selecting different routing entrances and/or exits with the cable sleeve mounted. For example, referring to FIG. 16, sleeve 66 is like sleeve 10 of FIG. 3 but for two slits 68 starting at the longitudinal edge 70 of the sleeve opposite the hook fasteners and adhesive and extending about one-half of the width of the sleeve. Slits separate the distal edge 70 of the sleeve into three distinct portions that are each separately engageable with the hooks with the cable sleeve mounted to a surface as shown in FIG. 17. Slits allow cable 12a and 12b to exit the sleeve without passing all the way between the two sleeve ends, for example. This can be particularly useful for cable management inside a computer or server cabinet, for example. Slits 68 can be provided as partially cut or perforated lines, allowing the user to choose to open up a particular one or more slits as needed. Another cable may be added with the cable support sleeve already holding other cables, by sequentially unfolding and reengaging flaps, starting at one end of the sleeve, or just by releasing a single flap and adding the extra cable to the set of cables secured by that flap. In this way sleeve 66 may be considered one cable support sleeve or a series of three independently manipulable sleeves defining entrances/exits between them.

While a number of examples have been described for illustration purposes, the foregoing description is not intended to limit the scope of the invention, which is defined by the scope of the appended claims. There are and will be other examples and modifications within the scope of the following claims.

What is claimed is:

1. A flexible support sleeve having an outer edge and comprising having an outer edge and:
   a knit fabric sheet having finite width and length and extending to opposite edges, the knit fabric sheet having a fastening face with loops of fibers extending away from a knit fabric base and forming part of a first side of the flexible support sleeve;
   a strip of resin of limited width and overlaying a first portion of the fastening face of the fabric sheet along one edge of the fabric sheet, the strip of resin comprising
   resin impregnating the fabric sheet to form a base; and
   an array of discrete male touch fastener elements carried on the base, each male touch fastener element comprising a stem extending from and contiguous with the base and a head disposed at a distal end of the stem and overhanging the base to form a crook for engaging the loops of the knit fabric sheet to form a releasable fastening; and
   a strip of adhesive disposed on a second side of the flexible support sleeve, at least partially underlying the strip of resin;
   wherein the base formed by the impregnating resin has a selvedge, coterminous with the outer edge of the flexible support sleeve and void of male touch fastener elements, such that the selvedge of the base is not engageable with the loops of the knit fabric sheet; and
   wherein the strip of adhesive underlays all of the discrete male touch fastener elements of the strip of resin.

2. The flexible support sleeve of claim 1, wherein the selvedge has a width, extending from the edge of the flexible support sleeve that is greater than 10 percent and less than 60 percent of the limited width of the strip of resin.

3. The flexible support sleeve of claim 1, wherein the array of discrete male touch fastener elements comprises rows of fastener elements extending parallel to the one edge of the fabric sheet.

4. The flexible support sleeve of claim 3, wherein the selvedge has a width greater than a width of a nearest one of the rows of fastener elements.

5. The flexible support sleeve of claim 1, wherein the strip of adhesive is at least as wide as the strip of resin.

6. The flexible support sleeve of claim 1, wherein the flexible support sleeve has a width, as measured perpendicular to the edge, that is between three and eight times the limited width of the strip of resin.

7. The flexible support sleeve of claim 6, wherein the flexible support sleeve is at least as long as it is wide.

8. The flexible support sleeve of claim 1, wherein the loops of fibers are disposed on the first side of the fabric sheet.

9. The flexible support sleeve of claim 1, further comprising a removable release liner covering the strip of adhesive.

10. The flexible support sleeve of claim 1, wherein the adhesive covers no more than half of the second side of the flexible support sleeve.

11. The flexible support sleeve of claim 1, wherein the knit fabric sheet has a basis weight of between about 280 and 330 grams per square meter.

12. The flexible support sleeve of claim 1, wherein the knit fabric sheet forms at least portions of each of the first and second sides of the flexible support sleeve.

13. The flexible support sleeve of claim 1, wherein the flexible support sleeve consists essentially of the knit fabric sheet, the strip of resin, and the strip of adhesive, plus any removable release liner covering the strip of adhesive.

14. The flexible support sleeve of claim 1, wherein the knit fabric sheet extends between the base and the adhesive and has an edge coterminous with the edge of the flexible support sleeve.

15. The flexible support sleeve of claim 1, wherein the fastening face of the knit fabric sheet covers all of the first side of the flexible support sleeve other than the strip of resin.

16. The flexible support sleeve of claim 1, wherein the loops of fibers of the fastening face of the knit fabric sheet extend to a height higher than an upper surface of the base of the strip of resin.

17. The flexible support sleeve of claim 16, wherein the touch fastener elements extend to about the same height as the loops of fibers of the fastening face of the knit fabric sheet.

18. The flexible support sleeve of claim 1, wherein the strip of adhesive is at least twice as wide as the strip of resin.

19. In combination, a series of multiple flexible support sleeves of claim 1 joined along adjacent longitudinal edges by frangible links.

20. The flexible support sleeve of claim 1, wherein the knit fabric sheet defines at least one slit extending from one of said opposite edges opposite the strip of resin.

* * * * *

UNITED STATES PATENT AND TRADEMARK OFFICE
CERTIFICATE OF CORRECTION

PATENT NO. : 12,278,468 B2
APPLICATION NO. : 18/113118
DATED : April 15, 2025
INVENTOR(S) : David D. Cianciolo, Jerry G. Hodsdon and Matthew P. Cunningham It is certified that error appears in the above-identified patent and that said Letters Patent is hereby corrected as shown below:

In the Claims

Column 6, Line 38, Claim 1, delete "comprising having an outer edge and:" and insert
-- comprising: --.

Signed and Sealed this
Twenty-seventh Day of May, 2025

Coke Morgan Stewart
*Acting Director of the United States Patent and Trademark Office*